May 26, 1959 J. BADER 2,887,979
HYDROFOIL CONTROL AND RETRACTION MECHANISM
Filed May 1, 1957 5 Sheets-Sheet 1
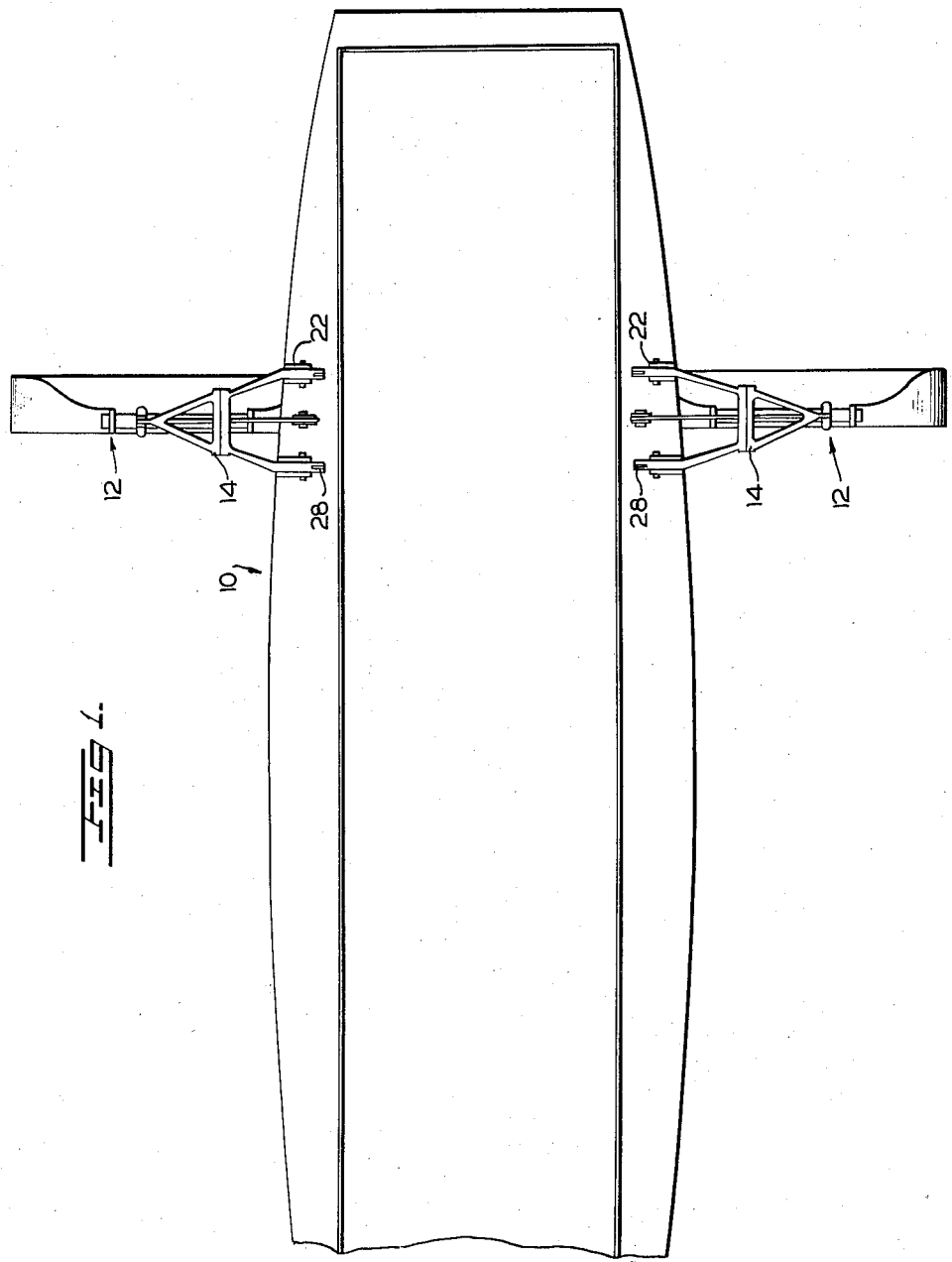
INVENTOR
JOHN BADER
BY George Sipkin
B. L. Zangwill
ATTORNEY

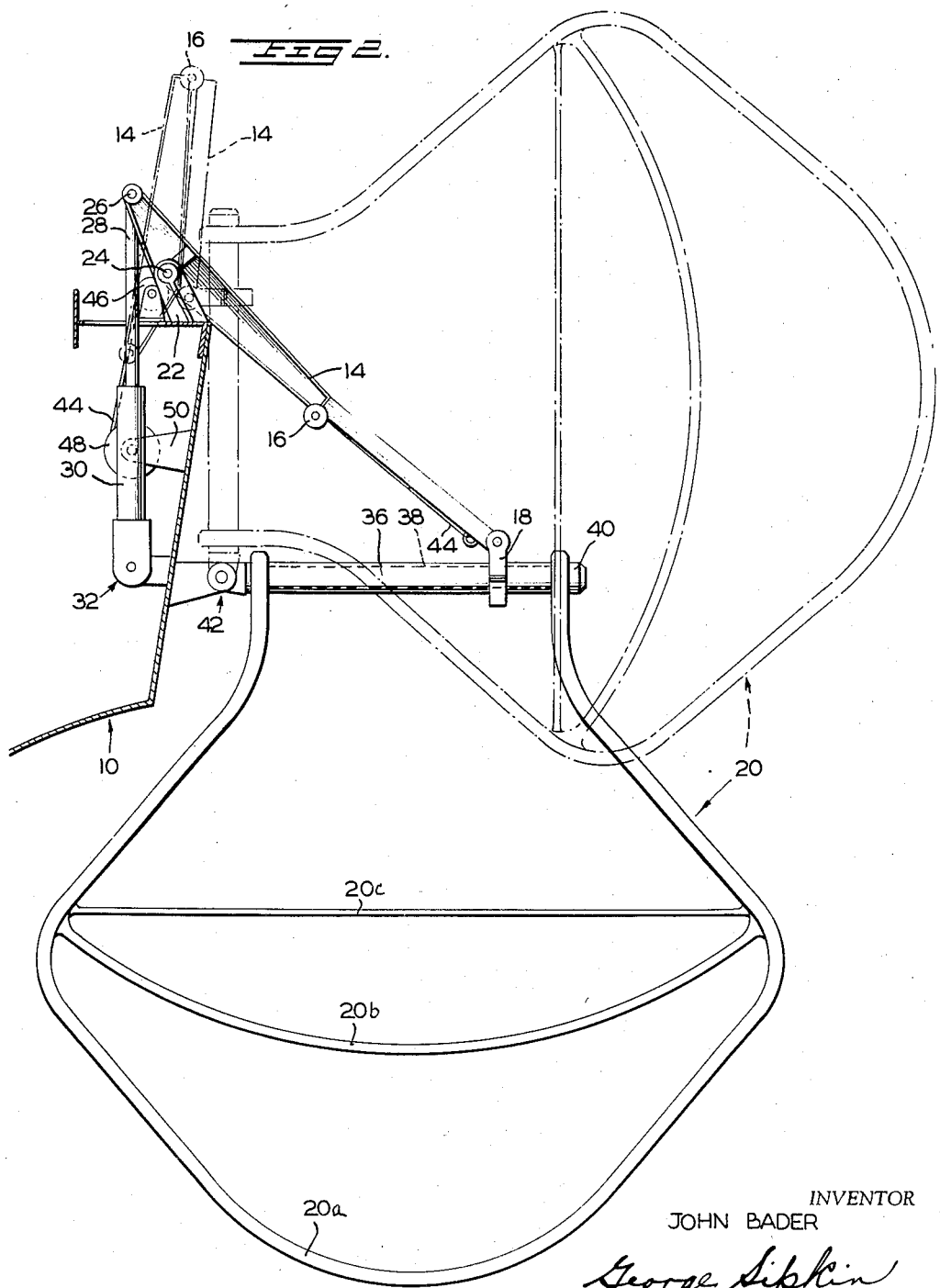

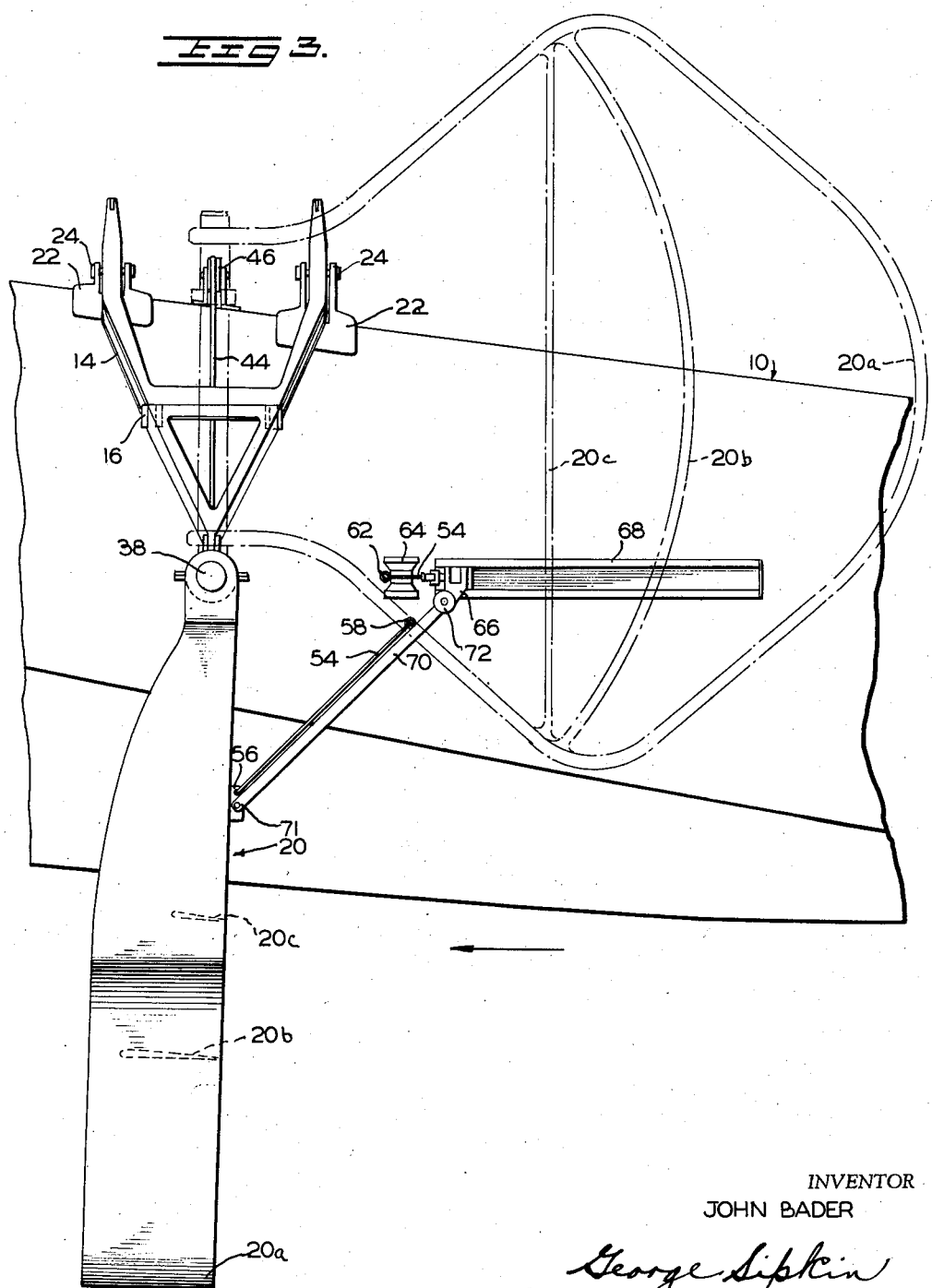

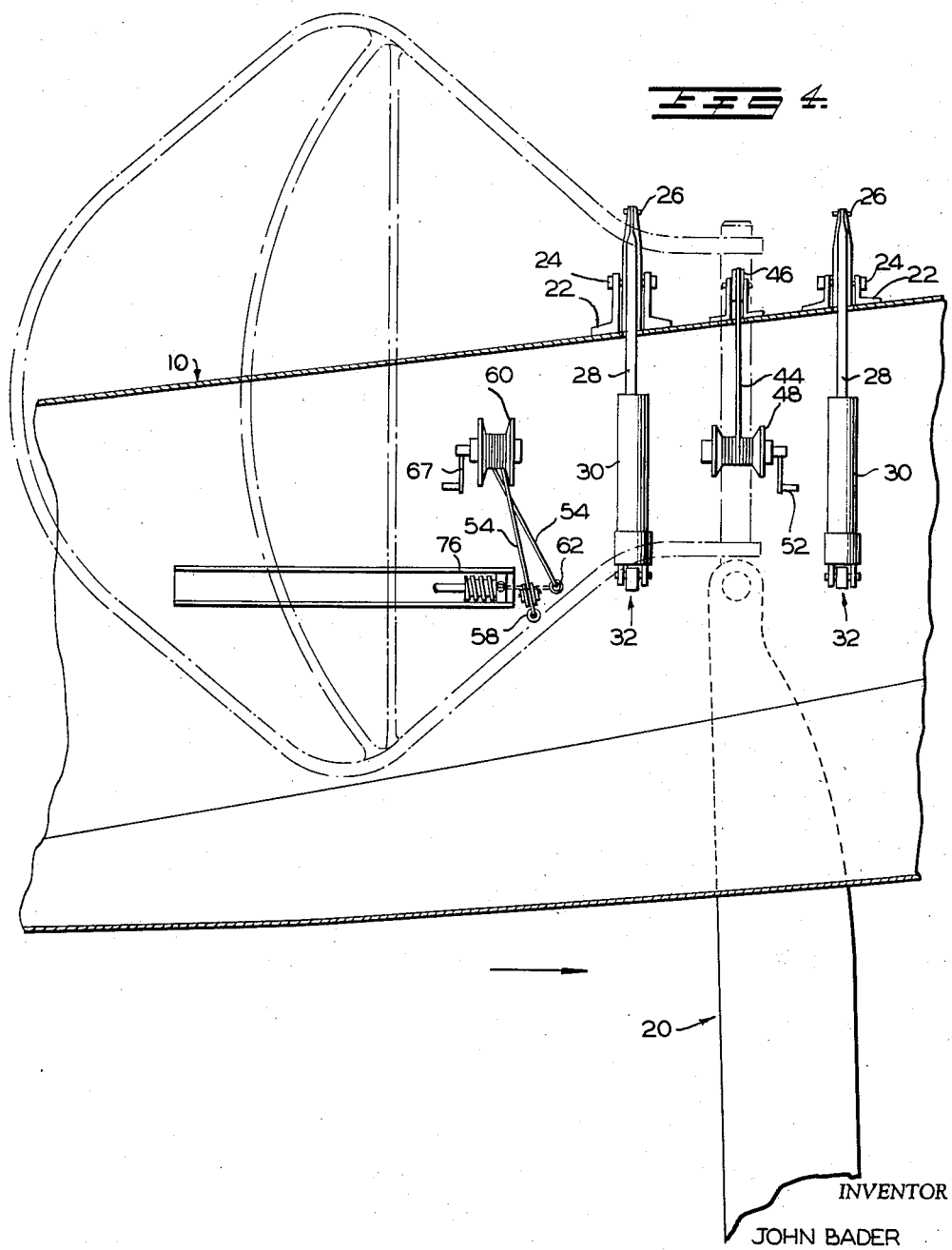

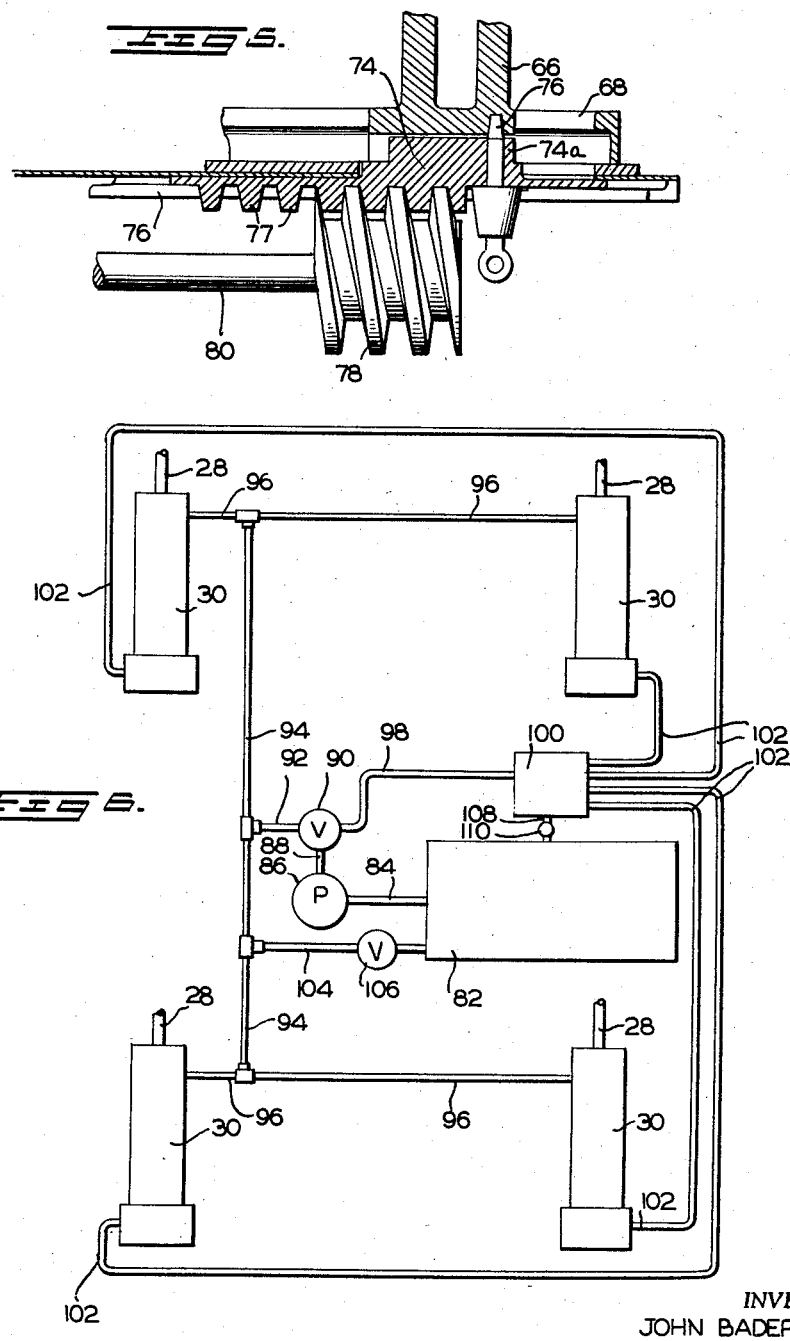

United States Patent Office 2,887,979
Patented May 26, 1959

2,887,979

HYDROFOIL CONTROL AND RETRACTION MECHANISM

John Bader, Washington, D.C.

Application May 1, 1957, Serial No. 656,470

15 Claims. (Cl. 114—66.5)

(Granted under Title 35, U.S. Code (1952), sec. 266)

The invention described herein may be manufactured and used by or for the Government of the United States of America for governmental purposes without the payment of any royalties thereon or therefor.

This invention relates to hydrofoil craft and particularly to mechanism for supporting and retracting the hydrofoils of such a craft.

Mechanisms designed heretofore for supporting and retracting hydrofoils have been cumbersome, complicated and not sufficiently rugged. Also such mechanisms have not been adapted for conveniently changing from hydrofoil borne to hull borne or vice versa while the craft is traveling at relatively high speeds.

It is accordingly a broad object of this invention to provide a hydrofoil support and retracting mechanism that is compact, simple and rugged.

A further object of the invention is to provide a hydrofoil mechanism adapted for changing with ease from hull borne to hydrofoil borne operations, and vice versa, while the craft is traveling at high speed.

A further object of the invention is to provide a mechanism for stabilizing a hydrofoil and for adjusting the angle of attack thereof during flight.

Other objects and many of the attendant advantages of this invention will be readily appreciated as the same becomes better understood by reference to the following detailed description when considered in connection with the accompanying drawings, wherein:

Fig. 1 is a partial top plan view of a water craft equipped with two forward hydrofoil mechanisms in accordance with this invention;

Fig. 2 is a front elevational view of a part of the craft shown in Fig. 1, showing the port side hydrofoil mechanism in down or flight position and showing the same hydrofoil in broken lines in partially retracted position;

Fig. 3 is a port side elevational view of the mechanism shown in Fig. 2, as viewed from outside the hull, and showing the hydrofoil in flight position in full lines and in fully retracted position in broken lines;

Fig. 4 is a side elevational view similar to Fig. 3, as viewed from inside the hull;

Fig. 5 is a top plan and partial horizontal sectional view of a hydrofoil locking and adjusting mechanism; and Fig. 6 is a schematic layout of a hydraulic system for operating the hydrofoil mechanisms.

Referring now to the drawings, which illustrate a preferred embodiment of the invention and wherein like reference characters designate like or corresponding parts throughout the several views, there is shown in Fig. 1, the hull 10 of a water craft equipped with a pair of hydrofoil mechanisms 12 near the forward end thereof. Suitable hydrofoil and propulsion mechanisms, not shown, may be mounted astern. Each of the hydrofoil mechanisms 12 is identical, except for right and left handedness. Therefore, a detailed description of but one hydrofoil mechanism, the left or port side, as viewed in Fig. 1, will be given.

Referring now to Figs. 2 and 3, each of the hydrofoil mechanisms includes a V-frame 14 provided with an offset elbow 16 at approximately the middle thereof and pivotally connected at the lower or outboard end by a collar bearing 18 to a hydrofoil 20, to be described in detail hereinafter. As will appear hereinafter, the off set elbow of the V-frame acts in the manner of a toggle for locking the hydrofoil in place. Near the upper or inboard end, each of the legs of the V-frame 14 is pivotally supported in a separate bifurcated bracket 22 by a pivot pin 24. The inboard end of each of the legs of the V-frame is bifurcated and connected by a pin 26 to the outer end of a piston rod 28. The inner ends of the piston rods are connected to pistons, not shown, mounted for reciprocation within a pair of cylinders 30 (Fig. 4), which cylinders are each pivotally mounted on the inside of the hull by a pin and bracket assembly 32. As described hereinafter, the hydraulic cylinders are provided with fluid inlet and outlet connections and are coupled together hydraulically for operation in unison.

The hydrofoil 20 may be of any suitable configuration and is shown in Fig. 2 as including a lower or high speed foil 20a, an intermediate or low speed foil 20b and a take-off foil and diagonal brace 20c. At the upper end, the hydrofoil is fixedly mounted on a tubular member 36 which in turn is rotatably mounted on a shaft 38. At its outboard end, shaft 38 is provided with a collar 40 for retaining the tubular member thereon; and at its inboard end, the shaft 38 is pivotally mounted on the outside of the hull by a bracket and bearing assembly indicated generally by reference character 42.

Referring still to Figs. 2 and 3, a wire cable 44 is attached to the apex of the V-frame and is led over a pulley 46 through a sheave, not shown, to a drum 48, which drum is rotatably mounted on a bifurcated bracket 50 attached to the inside of the hull (Fig. 2). Drum 48 is shown in Fig. 4 as being provided with a hand crank 52. However, in practice, the drum may be rotated by a worm gear or by a suitable power source synchronized with the hydraulic system to be described hereinafter.

A second wire cable 54 (Fig. 3) is connected to a bracket 56 affixed to the rear inboard side of hydrofoil 20; and this cable is lead through a first sheave means 58 to a drum 60 (Fig. 4) and from there through a second sheave means 62 and over a pulley 64 to a strut runner 66, to which it is attached. As with drum 48, drum 60 is mounted on the inside of the hull and is provided with a hand crank 67, although this drum also may be rotated by a worm gear or by a suitable power source. Returning to Fig. 3, strut runner 66, which is mounted for sliding movement within a guide 68 affixed to the exterior of the hull, has a strut 70 connected thereto, as by a universal joint 72, and the opposite end of the strut is pivotally connected by a pin 71 to bracket 56 attached to the rear of the hydrofoil.

Referring now to Fig. 5, a second or inside strut runner 74 is mounted for limited sliding movement in a guide 76 affixed to the inside of the hull. Runner 74 has a portion 74a that projects through an opening in the hull and is releasably connected to runner 66 by a spring-pressed bolt 76. On the inside of the hull, runner 74 is formed with gear teeth 77 in mesh with a worm gear 78, which worm gear is fixed on a shaft 80. Shaft 80 is mounted for rotation on the hull and may be rotated by suitable manual or power-operated means, not shown.

Referring now to Fig. 6, the hydraulic system for conveying fluid to and from the two pairs of hydraulic cylinders 30 (one pair for each hydrofoil mechanism) includes a hydraulic fluid reservoir 82 having a conduit 84 leading therefrom to a pump 86, which pump is connected by a conduit 88 to a two position valve 90. In one position of valve 90, pump 86 supplies hydraulic fluid to the top of each of the hydraulic cylinders 30 by way of a conduit 92 and branch conduits 94 and 96. In the second position of valve 90, pump 86 supplied hydraulic fluid to the bottom of hydraulic cylinders 30 by way of a conduit 98, a constant rate bleed control and fluid distributor 100, and branch conduits 102. A return conduit 104, having a valve 106 therein, leads from one of the branch conduits 94 back to fluid reservoir 82. A second return conduit 108 having a valve 110 therein connects distributor 100 to fluid reservoir 82.

Thus, it is seen, with pump 86 energized, valve 90 positioned to supply fluid to the top of the hydraulic cylinders, valve 106 closed and valve 110 open, fluid is simultaneously supplied to the top of each of the cylinders which forces the pistons downward therein, which in turn force hydraulic fluid from the bottom of the cylinders through branch conduits 102, distributor box 100 and conduit 108 to the fluid reservoir. With the reverse operation, that is with valve 90 positioned to supply hydraulic fluid to the bottom of cylinders 30, valve 106 open and valve 110 closed, hydraulic fluid simultaneously supplied to the bottom of each of the cylinders forces the pistons upward therein, which in turn causes fluid to flow from the top of the cylinders through branch conduits 96 and 94, conduit 104 and valve 106 into fluid reservoir 82. The constant rate bleed control and distributor box 100 is so arranged, as by an orifice, not shown, for each of the branch conduits 102, that fluid flows into and from each of the four hydraulic cylinders at a uniform rate of flow. This uniform flow of fluid to and from the hydraulic cylinders causes the hydrofoils to be raised and lowered in unison and at the same rate.

In operation, when, for example, it is desired to change from foil borne operation to hull borne operation, that is, to retract the hydrofoils from the full line positions shown in Figs. 2 and 3 to the fully retracted position shown in broken lines in Figs. 3 and 4, pump 86 is energized and valve 90 positioned so that fluid flows therefrom through conduit 92, branches 94 and 96 into the tops of cylinders 30. For this operation, valve 106 is closed and valve 110 is open. The flow of fluid into the top of cylinder 30 (Fig. 2) forces piston rod 28 downward. V-frame 14 pivots on pins 24 and the joint 16 of V-frame 14 breaks, tending to raise the hydrofoil. Thereupon, the hydrofoil shaft 38 and tube 36 rotate upwardly about bearing 42, thus lifting the hydrofoil 20 from the water. After the hydrofoil stops lifting, that is, when the piston rod 28 has completed its downward stroke, drum 48 is rotated counter-clockwise (Fig. 2) whereupon, cable 44 draws the hydrofoil into the vertical position shown in broken lines in Fig. 2. The hydrofoil can be locked in raised position as by a ratchet mechanism, not shown, on drum 48.

The hydrofoil is then rotated about the shaft 38 from the broken line position of Fig. 2, generally perpendicular to the hull, to the fully stowed position alongside the hull, as shown in broken lines in Figs. 3 and 4. Before this latter rotation can be accomplished, the lock bolt 76 (Fig. 5) is withdrawn so as to free the runner 66 for sliding movement along the guide 68 (Fig. 3). With lock bolt 76 withdrawn, drum 60 (Fig. 4) is rotated in a manner that cable 54 is drawn in through sheave 58 which causes the hydrofoil 20 to be rotated about shaft 38 and drawn into stowed position alongside the hull, which in turn causes the strut 70 to force the runner 66 to the opposite end of guide 68 and pull the opposite end of cable 54 through sheave 62. The hydrofoil may be locked into the stowed position by any suitable means, not shown.

The operations for lowering the hydrofoils are just the opposite of those for retracting. That is, drum 60 (Fig. 4) is rotated in the opposite direction which causes the runner end of cable 54 to be drawn in through sheave 62 this causes runner 66 to be moved forwardly in guide 68, which through strut 70 causes the hydrofoil to be rotated outwardly of the hull about shaft 38 from the broken line position of Figs. 3 and 4 to the broken line position of Fig. 2, after which the lock bolt 76 engages runner 66 securing the runner in place. When the foil plane is perpendicular to the hull, as shown in broken lines in Fig. 2, then by lowering dead weight of the hydrofoil by unwinding cable 44 from drum 48 and by reversing the valves and the movement of the hydraulic piston rods 28, the hydrofoil is lowered into operating position in the water, the off set joint 16 operating in the manner of a toggle locking the mechanism in the lowered or full line position shown in Fig. 2. The angle of attack control (Fig. 5), is locked and the boat can proceed foil borne. With runner 74 locked to runner 66 by bolt 76 (Fig. 5), the angle of attack of the hydrofoil may be adjusted by a slight rotation of shaft 80. That is, rotation of shaft 80 in the desired direction causes rotation of worm gear 78, which, through rack 77, causes unitary sliding movement of runners 74 and 66. As shown in Fig. 3, runner 66 is connected by strut 70 to hydrofoil 20, so that sliding movement of runner 66 causes the hydrofoil to pivot about shaft 38 and thereby adjust the angle of attack of the hydrofoil.

Thus, it is seen, in accordance with this invention, applicant has provided a hydrofoil support and retracting mechanism that is compact, simple and rugged, which mechanism is adapted for conveniently changing from hydrofoil borne to hull borne operations or vice versa while the craft is traveling at relatively high speeds and by which mechanism the angle of attack of the hydrofoils can be changed with ease during flight.

It should be understood, of course, that the foregoing disclosure relates to only a preferred embodiment of the invention and that numerous modifications or alterations may be made therein without departng from the spirit and the scope of the invention as set forth in the appended claims.

What is claimed is:

1. A hydrofoil craft comprising a hull, a pair of hydrofoils for supporting the craft in flight on a body of water and means rotatably mounting the hydrofoils one on each side of the hull, said mounting means each including a shaft having an outboard end thereof free to move in a vertical plane and an inboard end thereof pivotally mounted on the hull on an axis substantially parallel with the longitudinal axis of the hull for rotary movement of the shaft and attached hydrofoil in a plane transverse of the longitudinal axis of the hull and means rotatably mounting the hydrofoil on the shaft for rotary movement of the hydrofoil relative of the shaft and fore and aft of the hull.

2. A hydrofoil craft as set forth in claim 1 wherein the means rotatably mounting the hydrofoils includes means for retracting the hydrofoils clear of the body of water upon which the craft is borne to thereby change from foil borne to hull borne operation while the craft is moving at relatively high speeds.

3. A hydrofoil craft as set forth in claim 1 wherein the means rotatably mounting the hydrofoils includes means for simultaneously and uniformly retracting the pair of hydrofoils clear of the body of water upon which the craft is borne to thereby change from foil born to hull borne operation while the craft is moving at relatively high speeds.

4. A hydrofoil craft as set forth in claim 1 wherein the means rotatably mounting the hydrofoils includes means for lowering the hydrofoils into the body of water from a stowed position clear of the body of water to thereby change from hull borne to foil borne operation while the craft is moving at relatively high speeds.

5. A hydrofoil craft as set forth in claim 1 wherein the means rotatably mounting the pair of hydrofoils includes means for simultaneously and uniformly lowering the pair of hydrofoils into the body of water from a stowed position clear of the body of water to thereby change from hull borne operation to foil borne operation while the craft is moving at relatively high speeds.

6. A hydrofoil craft as set forth in claim 1 wherein the means rotatably mounting the pair of hydrofoils includes means for simultaneously and uniformly raising the pair of hydrofoils from within the body of water to stowed position above the body of water and for simultaneously and uniformly lowering the pair of hydrofoils from the stowed position to a position within the body of water to thereby respectively change from foil borne to hull borne and from hull borne to foil borne operations while the craft is moving at relatively high speeds.

7. A hydrofoil craft as set forth in claim 1 wherein the means rotatably mounting the hydrofoil on the shaft includes means for adjusting the angle of attack of the hydrofoil while the craft is in motion.

8. A hydrofoil craft comprising a hull, a pair of hydrofoils for supporting the craft in flight on a body of water, and a pair of mechanisms mounting the hydrofoils one on each side of the hull for movement relative thereto from a flight position wherein a major plane of each of the hydrofoils is substantially perpendicular to the sides of the hull to a stowed position wherein said major plane is substantially parallel to the sides of the hull, each of said mounting mechanisms including means for raising the hydrofoil from the flight position to a position above the surface of the body of water while maintaining the major plane of the hydrofoil substantially perpendicular to the side of the hull and means for rotating the hydrofoil to the stowed position with the major plane thereof substantially parallel to the side of the hull.

9. A hydrofoil craft as set forth in claim 8 wherein the mounting mechanisms include means for simultaneously and uniformly raising and stowing the pair of hydrofoils.

10. A hydrofoil craft as set forth in claim 8 wherein the mounting mechanisms include means for simultaneously and uniformly lowering the hydrofoils from the stowed position to the flight position while the craft is in motion.

11. A hydrofoil craft as set forth in claim 8 wherein the means for raising the hydrofoil includes a foldable toggle member having an off-center joint substantially midway its length, means pivotally connecting an inboard portion of the toggle member to the hull of the craft, means pivotally connecting an outboard end of the toggle member to an outboard end of the hydrofoil, and power mechanism connected to an inboard end of the toggle member for pivoting such member about its connection with the hull, the construction and arrangement of the toggle member being such that power applied to the inboard end of such member causes the member to fold at its off-center joint whereby the hydrofoil is raised from the flight position to the raised position above the surface of the body of water.

12. A hydrofoil craft as set forth in claim 11 which includes means for releasably retaining the toggle member in the folded position.

13. A hydrofoil craft as set forth in claim 12 wherein the toggle member is pivotally mounted upon the hull and connected to the hydrofoil in a manner as to lower the hydrofoil to flight position by gravity upon release of the retaining means.

14. A hydrofoil craft as set forth in claim 8 wherein the means for rotating the hydrofoil from the raised position perpendicular to the side of the hull to the stowed position includes a runner slidably mounted on the hull, a strut connecting the runner to the hydrofoil, a drum rotatably mounted on the hull, and a cable having one end thereof connected to the hydrofoil, an opposite end thereof connected to the runner and an intermediate portion thereof wound around the drum, the construction and arrangement being such that rotation of the drum in one direction causes the cable to rotate the hydrofoil from the raised position to the stowed position, whereas rotation of the drum in an opposite direction causes the cable to rotate the hydrofoil from the stowed to the raised position.

15. A hydrofoil craft comprising a hull, a pair of hydrofoils for supporting the craft in flight on a body of water and a pair of mechanisms rotatably mounting the hydrofoils one on each side of the hull, said mounting mechanisms each including a shaft having an inboard end thereof pivotally mounted for rotary movement of the shaft athwartship on an axis substantially parallel to the longitudinal axis of the hull through a vertical plane substantially transverse the longitudinal axis of the hull from a horizontal position substantially perpendicular to the longitudinal axis of the hull to a vertical position still substantially perpendicular to such longitudinal axis, means for rotating the shaft from the horizontal to the vertical position, and vice versa, means mounting the hydrofoil on the shaft for bodily movement therewith and for rotary movement relative thereto fore and aft of the hull, and means for rotating the hydrofoil relative to the shaft.

References Cited in the file of this patent

UNITED STATES PATENTS 2,795,202     Hook _____ June 11, 1957

FOREIGN PATENTS 572,413     Great Britain _____ Oct. 8, 1945